United States Patent [19]

Finger

[11] Patent Number: 5,579,770
[45] Date of Patent: Dec. 3, 1996

[54] MULTIPLE TRANSMIT ZONE SPLICING

[75] Inventor: David J. Finger, San Jose, Calif.

[73] Assignee: Acuson Corporation, Mountain View, Calif.

[21] Appl. No.: 435,091

[22] Filed: May 2, 1995

[51] Int. Cl.$^6$ ............................................. A61B 8/00
[52] U.S. Cl. .................................. 128/661.01; 73/626
[58] Field of Search .................. 128/660.05, 660.07, 128/660.08, 661.01; 73/624, 625, 626, 628, 641

[56] References Cited

U.S. PATENT DOCUMENTS

| | | | |
|---|---|---|---|
| 3,690,153 | 9/1972 | Matay | 73/67.8 R |
| 4,043,181 | 8/1977 | Nigam | 73/67.8 R |
| 4,176,658 | 12/1979 | Kossoff et al. | 128/660 |
| 4,356,731 | 11/1982 | Mahony | 73/631 |
| 4,389,893 | 6/1983 | Ophir et al. | 73/599 |
| 4,398,539 | 8/1983 | Proudian . | |
| 4,408,492 | 10/1983 | Kossoff et al. | 73/631 |
| 4,441,368 | 4/1984 | Flax | 73/599 |
| 4,452,085 | 6/1984 | Pelc et al. | 73/631 |
| 4,470,303 | 9/1984 | O'Donnell | 73/602 |
| 4,475,400 | 10/1984 | Flax | 73/631 |
| 4,513,621 | 4/1985 | Renzel et al. | 73/631 |
| 4,569,353 | 2/1986 | Ferrari | 128/660 |
| 4,662,380 | 5/1987 | Riley | 128/660 |

(List continued on next page.)

FOREIGN PATENT DOCUMENTS

| | | |
|---|---|---|
| 1329733 | 5/1963 | France . |
| 1534366 | 7/1976 | United Kingdom . |
| 2045435 | 10/1980 | United Kingdom . |

OTHER PUBLICATIONS

Claesson et al., "Frequency—and Depth–Dependent Compensation of Ultrasonic Signals," *IEEE Trans. on Ultrasonics, Ferro, and Freq. Control*, Sep. 1988. DeClercq et al., Adaptive Gain Control for Dynamic Ultrasound Imaging, 1975.

*Ultrasonics Symposium Proceedings*, pp. 59–63. Janssen et al., "Adaptive Interpolation of Discrete—Time Signals That Can Be Modeled as Autoregressive Processes," *IEEE Trans. on Acoustics, Speech and Signal Processing*, Apr. 1986, pp. 317–330.

Kristoffersen et al., "A Time–Shared Ultrasound Doppler Measurement and 2–D Imaging System," *IEEE Trans. on Biomedical Engineering*, May 1988, pp. 285–295.

Kuc, "Ultrasonic Tissue Characterization Using Kurtosis," *IEEE Trans. on Ultrasonics, Ferro. and Freq. Control*, May 1986.

Ophir et al., "Digital Scan Converters in Diagnostic Ultrasound Imaging," *Proc. of the IEEE*, Apr., 1979, pp. 654–663.

*Primary Examiner*—George Manuel
*Attorney, Agent, or Firm*—Majestic, Parsons, Siebert & Hsue

[57] ABSTRACT

The invention includes a method and system for multiple transmit zone splicing in an ultrasound imaging system. Acoustic signals from a pair of adjacent transmit zones are crossfaded in a region where the two transmit zones overlap (an "overlap region"), to produce a set of combined acoustic signals that transition from one transmit zone to the next with little or no delineation between transmit zones. The crossfade is linear and for the entire overlap region; however, the crossfade may alternatively employ a nonlinear function, or may encompass regions near to the overlap region. When a scan line comprises more than two transmit zones, pairs of transmit zones are crossfaded, preferably at each overlap region. When overlap regions are close to each other, a crossfade employing more than two transmit zones may be employed, such as a linear crossfade in which acoustic signals from three or more transmit zones are weighted and summed.

15 Claims, 5 Drawing Sheets

U.S. PATENT DOCUMENTS

| | | | |
|---|---|---|---|
| 4,665,924 | 5/1987 | Saito et al. . | |
| 4,691,570 | 9/1987 | Hassler . | |
| 4,699,009 | 10/1987 | Maslak et al. | 73/626 |
| 4,707,813 | 11/1987 | Moeller et al. . | |
| 4,745,398 | 5/1988 | Tjornehoj et al. | 73/599 |
| 4,751,846 | 6/1988 | Dousse | 73/602 |
| 4,779,622 | 10/1988 | Nakamura et al. . | |
| 4,785,818 | 11/1988 | Hardin | 128/660.07 |
| 4,786,818 | 11/1988 | Mead et al. | 250/578 |
| 4,813,279 | 3/1989 | Shirasaka . | |
| 4,817,617 | 4/1989 | Takeuchi et al. | 128/660.05 |
| 4,852,576 | 8/1989 | Inbar et al. | 128/660.06 |
| 4,887,306 | 12/1989 | Hwang et al. | 382/54 |
| 4,974,558 | 12/1990 | Katakura et al. . | |
| 5,107,841 | 4/1992 | Sturgill | 128/661.09 |
| 5,111,824 | 5/1992 | Lazenby et al. . | |
| 5,113,706 | 5/1992 | Pittaro | 73/626 |
| 5,226,420 | 7/1993 | Peterson | 128/661.09 |
| 5,249,548 | 10/1993 | Dupuy | 119/243 |
| 5,271,404 | 12/1993 | Corl et al. | 128/661.08 |
| 5,287,753 | 2/1994 | Routh et al. | 73/861.25 |
| 5,301,168 | 4/1994 | Miller | 367/138 |
| 5,301,674 | 4/1994 | Erikson et al. | 128/661.01 |
| 5,313,948 | 5/1994 | Murashita et al. | 128/662.02 |
| 5,462,057 | 10/1995 | Hunt et al. . | |

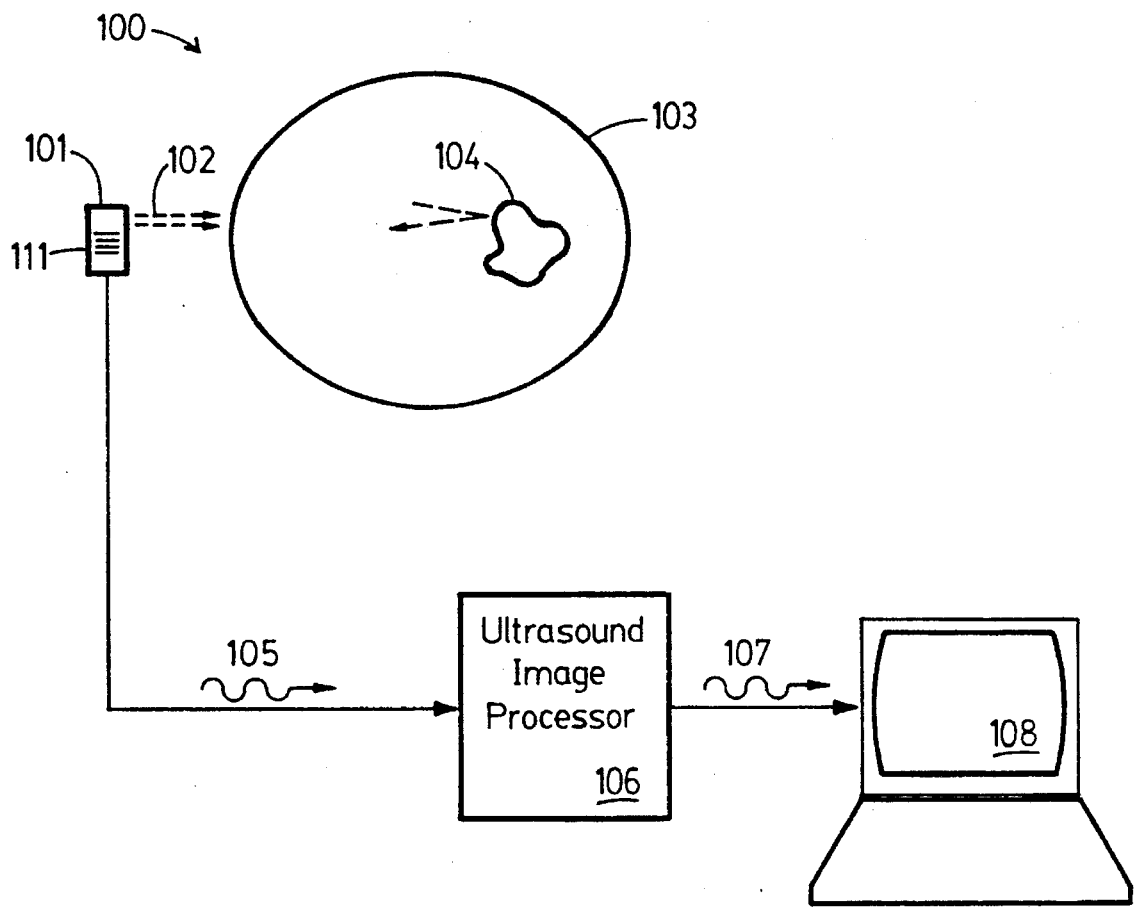
FIG._1.

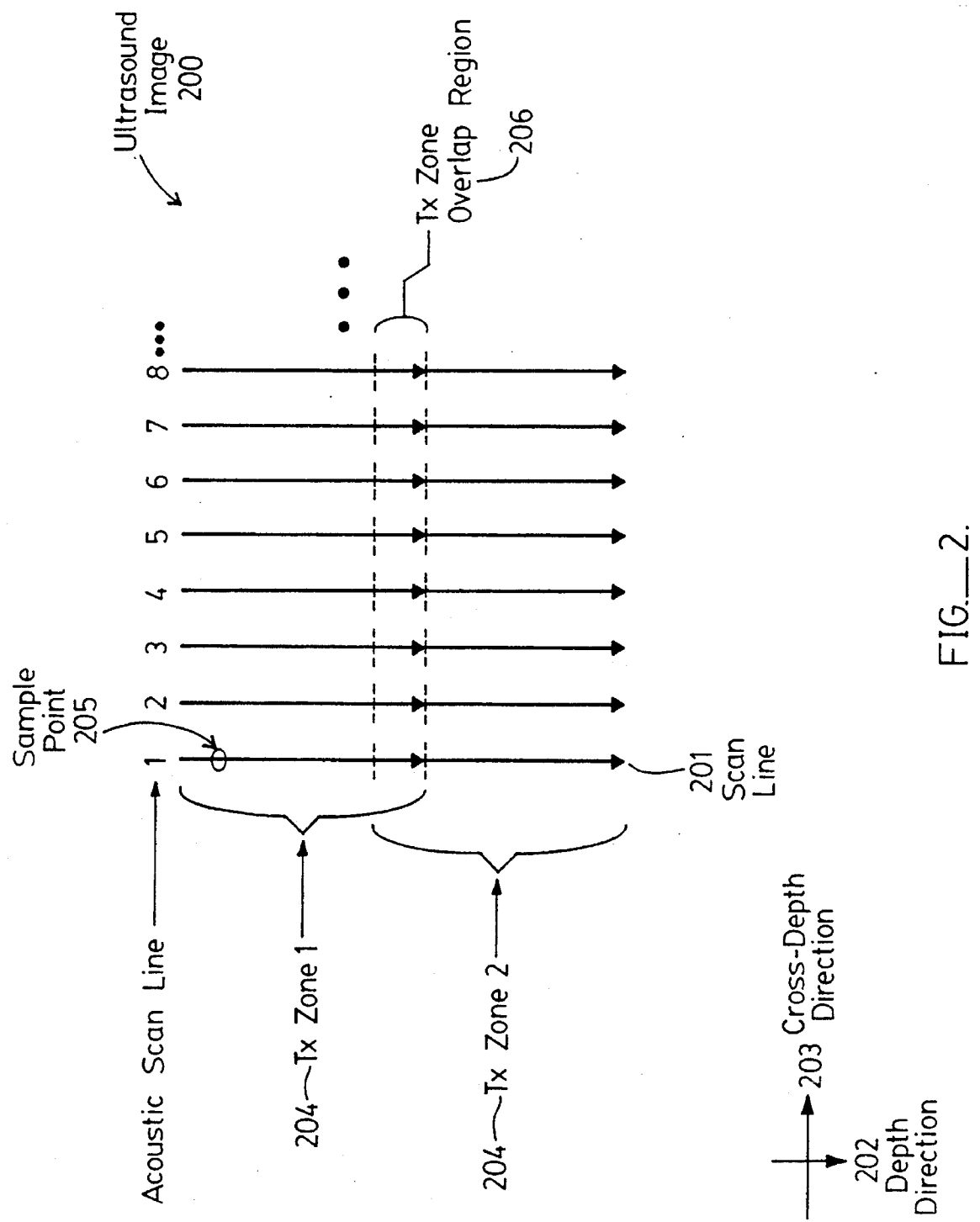
FIG._2.

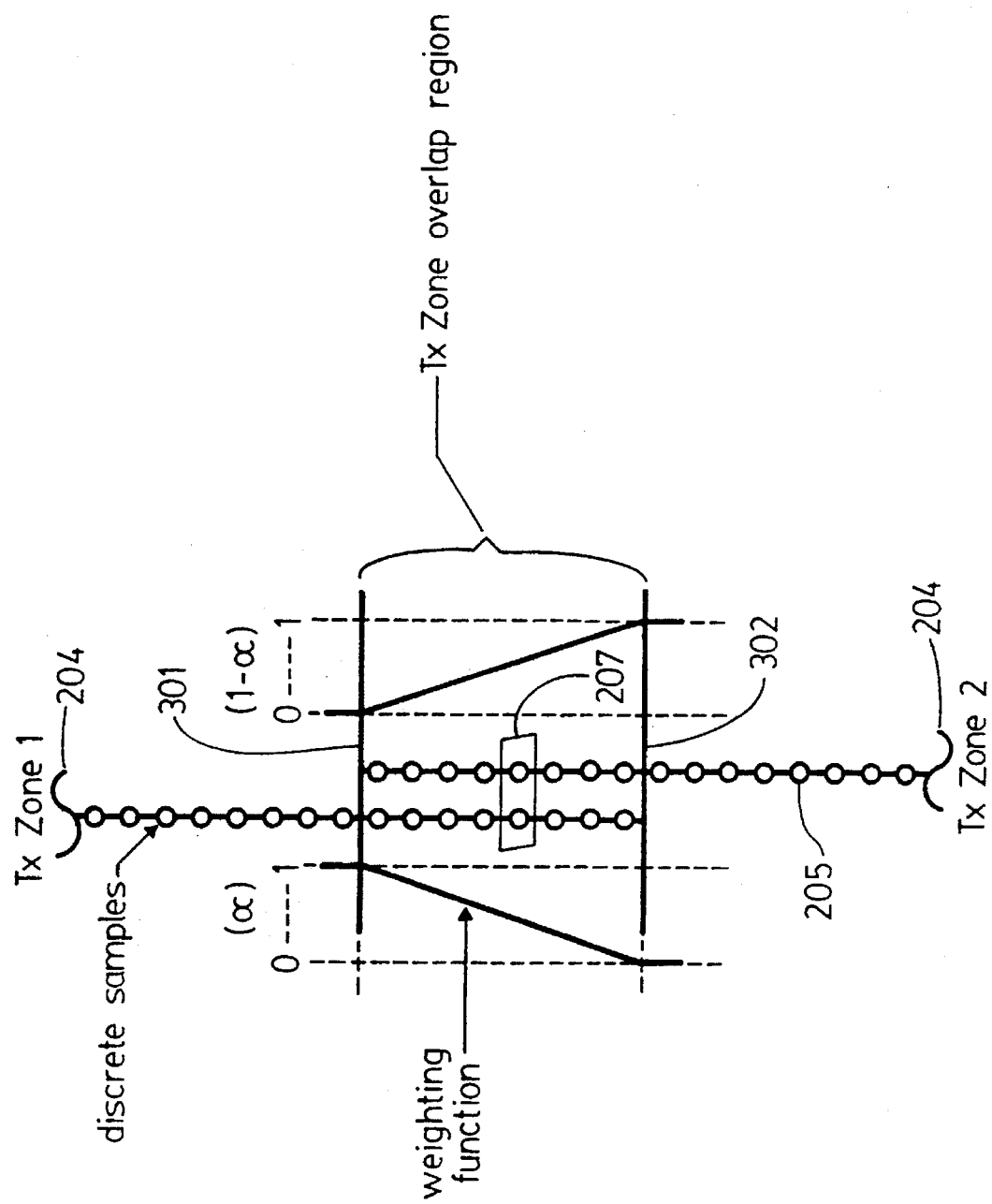
FIG._3.

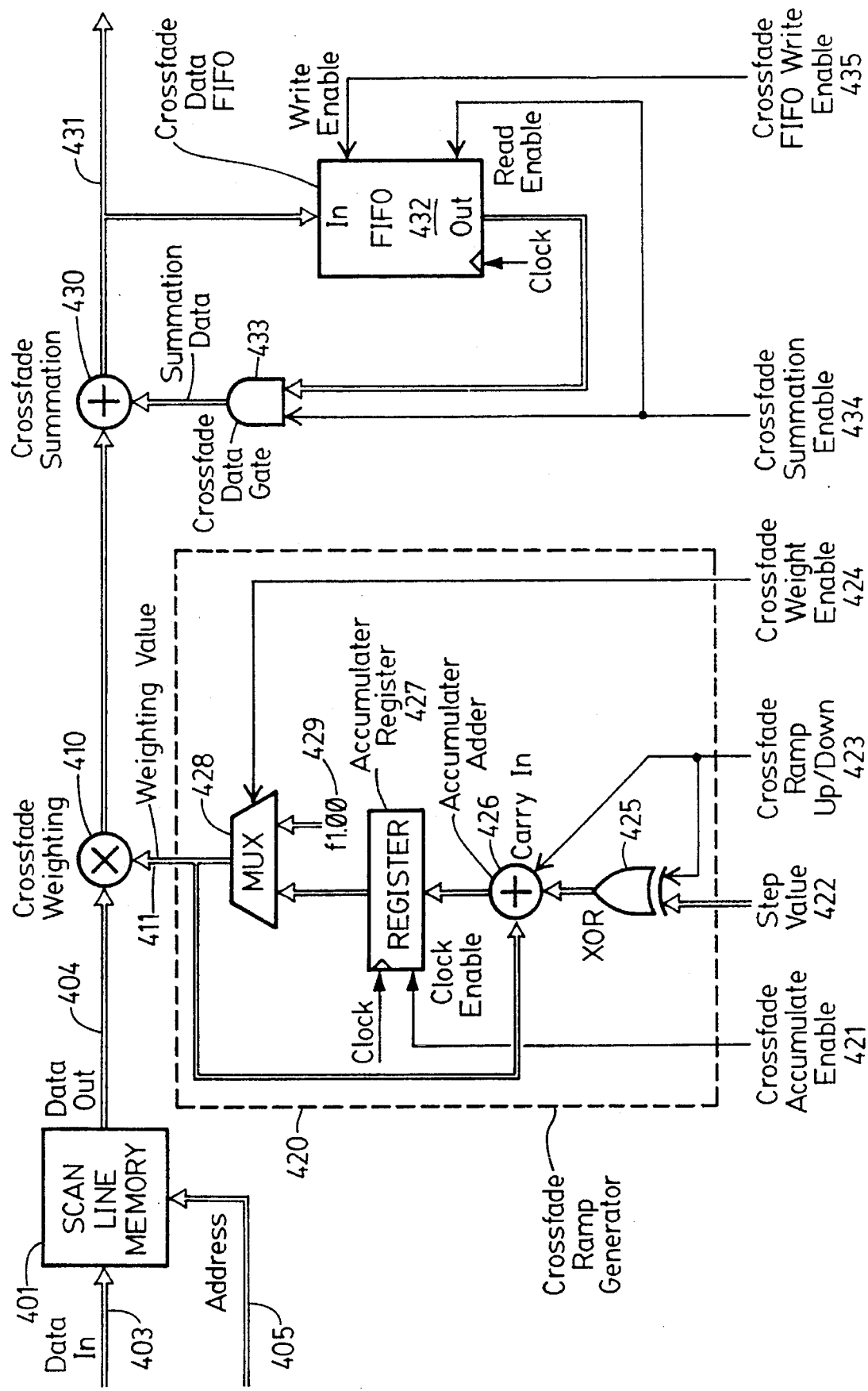
FIG._4A.

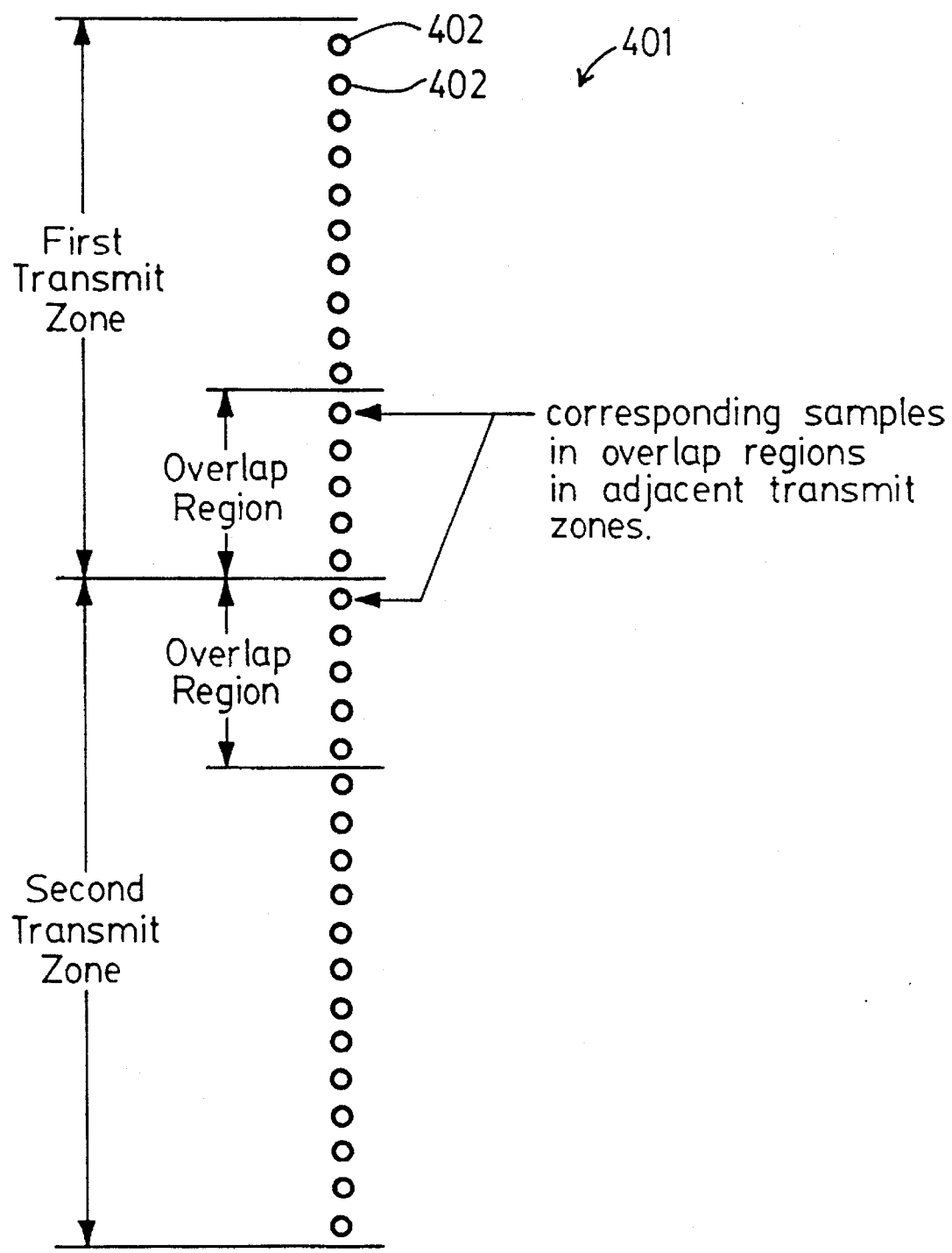
FIG._4B.

MULTIPLE TRANSMIT ZONE SPLICING

BACKGROUND OF THE INVENTION

1. Field of the Invention

This invention relates to multiple transmit zone splicing in an ultrasound imaging system.

2. Description of Related Art

Ultrasound imaging systems generally operate by transmitting ultrasound signals from an ultrasound transducer or a plurality of transducer elements into a human body at a skin surface or within a body cavity, and receiving ultrasound signals reflected by objects or structures, such as organ tissue or other acoustic interfaces in a scan region (such as a scan plane), back to the ultrasound transducer.

The transmitted ultrasound signals form an acoustic scan line, generally focused at a focal point on the scan line. The reflected ultrasound signals which are received are processed to generate successive sample points representing reflected acoustic energy along the scan line. A region of samples along the received scan line, within which the ultrasound energy was focused when transmitted is called a "transmit zone".

One problem which has arisen in the art is where there are multiple transmit zones in a scan line, i.e., where a single scan line comprises two or more zones in which ultrasound energy is independently focused. Multiple transmit zones may be necessary or convenient, for example, to improve resolution through a depth range to be imaged. When combining multiple transmit zones, boundary delineation between zones due to differences in the focus and apparent gain within the zones, may be apparent to an operator and produce an undesirable artifact in an ultrasound image.

One method of the prior art has been to simply abut adjacent transmit zones in range. While this method of the prior art achieves the goal of constructing an entire scan line image using multiple transmit zones, it suffers from the drawback that zone boundaries are readily apparent in a large number of imaging situations, due to focus and gain variations between the transmit zones. The appearance of the zone boundary is an undesirable artifact in the displayed image.

Another method of the prior art has been to stagger the transmit zone boundary for alternate scan lines, and to average pairs of adjacent scan lines. While this method of the prior art achieves the goal of constructing an entire scan line image using multiple transmit zones, it suffers from the drawback that averaging pairs of adjacent scan lines reduces cross-range resolution (e.g., azimuthal resolution). Moreover, this method of the prior art has the drawback that it is not amenable to architectures which employ cross-range interpolation (e.g., azimuthal interpolation) to generate one or more interpolated scan lines between real scan lines, prior to the step of averaging adjacent scan lines.

U.S. Pat. No. 5,113,706, "Ultrasound System with Dynamic Transmit Focus", issued May 19, 1992, in the name of Richard J. Pittaro, and assigned to Hewlett-Packard Company, shows an ultrasound system in which focal points and gain are stepped through a series of focal zones, so as to piece together a field larger than a single transmit zone. While the method shown by this patent may achieve large depth of field, it does not solve the problem presented by multiple transmit zones, and still suffers from the drawback that there may be a significant discontinuity at points where there is a significant gain change or focusing characteristic change.

SUMMARY OF THE INVENTION

The invention provides a method and system for multiple transmit zone splicing in an ultrasound imaging system. In a preferred embodiment, acoustic signals from a pair of adjacent transmit zones are crossfaded in a region where the two transmit zones overlap (an "overlap region"), to produce a set of combined acoustic signals that smoothly transition from one transmit zone to the next. Preferably, the crossfade is linear and for the entire overlap region; however, in alternative embodiments, the crossfade may employ a non-linear function, or may encompass regions near to the overlap region. When a scan line comprises more than two transmit zones, pairs of transmit zones are crossfaded, preferably at each overlap region. When overlap regions are close to each other, a crossfade employing more than two transmit zones may be employed, such as a linear crossfade in which acoustic signals from three or more transmit zones are weighted and summed.

BRIEF DESCRIPTION OF THE DRAWINGS

FIG. 1 shows a block diagram of an ultrasound imaging system.

FIG. 2 shows a set of scan lines having multiple transmit zones.

FIG. 3 shows a single scan line having multiple transmit zones.

FIG. 4 collectively comprises FIG. 4A and FIG. 4B. FIG. 4A shows a data flow diagram for a linear crossfade. FIG. 4B shows a data storage diagram for a linear crossfade.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The Ultrasound Imaging System

FIG. 1 shows a block diagram of an ultrasound imaging system.

Elements of the ultrasound imaging system are described herein with reference to transmit zone splicing and insofar as they relate to transmit zone splicing. Further information about ultrasound systems may be found by reference to incorporated disclosures, by reference to "Digital Instrumentation of Diagnostic Medical Ultrasound", by Peter Fish (John Wiley & Sons 1990, 1992), or by reference to "Ultrasonic Bioinstrumentation", by Douglas A Christensen (John Wiley & Sons 1988).

An ultrasound imaging system 100 comprises a probe comprising an ultrasound transducer array 101 having a set of transducer elements 111, for generating ultrasound acoustic signals 102 that are typically directed in a scan plane 103, typically behind a skin surface or in a body cavity such as in a human body.

The acoustic signals 102 are reflected by objects or structures 104 in the scan plane 103, and return to the transducer elements 111. The transducer elements 111 convert the reflected ultrasound acoustic signals 102 into a set of corresponding electrical signals 105, and transmit those electrical signals 105 to an ultrasound image processor 106. The ultrasound image processor 106 produces, in response to the electrical signals 105, a display signal 107, which it transmits to a display device 108 (such as a monitor) for display to, and viewing by, an operator.

In a preferred embodiment, the ultrasound transducer array 101 comprises a set of 128 transducer elements 111, disposed and controlled to operate on a like set of 128 channels. The acoustic signals 102 from the transducer elements 111 are each focused using time delay and/or phase adjustment to a selected depth within the scan plane 103, and the reflected acoustic signals 102 are collected.

In a preferred embodiment, the ultrasonic transducer array 101 and its transducer elements 111 comprise PZT (lead zirconate titanate), constructed in a manner known in the art, and operate using ultrasound energy in about the 2 Megahertz range to about the 10 Megahertz range, or another known ultrasound frequency range. The selected depth is preferably between about zero millimeters and about 300 millimeters, or other known depths for ultrasound imaging systems.

In a preferred embodiment, the display device 108 comprises a keyboard and an RGB monitor having a screen size of about 640 pixels by about 480 pixels. However, in alternative embodiments, other screen sizes and other monitors would be workable, and are within the scope and spirit of the invention. Preferably, the acoustic signals are scan converted after beamforming and transmit zone splicing, and before display. Scan conversion is known in the art. However, in alternative embodiments, transmit zone splicing as described herein may occur at another time or processing stage during ultrasound image processing, such as after scan conversion and before display.

Transmit Zone Splicing

FIG. 2 shows a set of scan lines having multiple transmit zones.

In the ultrasound imaging system 100, a beamformer circuit (not shown) amplifies and transmits the acoustic signals 102 so as to form an acoustic scan line and to focus ultrasound energy in the scan plane 103. Ultrasound energy may be focused on a single focal point, or in some transmit modes, on multiple focal points. Upon return to the transducer elements 111, the acoustic signals 102 reflected from that beam are converted into a set of corresponding electrical signals 105 representing a set of sample points along the acoustic scan line.

A set of such sample points collectively form a pre-scan-conversion ultrasound image 200. The pre-scan-conversion ultrasound image 200 comprises a set of acoustic scan lines 201, each proceeding in a depth direction 202, shown generally vertically in FIG. 2. The acoustic scan lines 201 appear in the ultrasound image 200 arranged in a cross-depth direction (e.g., an azimuthal direction) 203, shown generally horizontally in FIG. 2.

In a preferred embodiment, each acoustic scan line 201 comprises a plurality of transmit zones, within each one of which the ultrasonic transducer array 101 and its transducer elements 111 focus the ultrasound energy, under control of a beamformer circuit. Focusing ultrasound energy in each one of a plurality of transmit zone generates a corresponding plurality of sets of sample points.

FIG. 2 shows each scan line 201 as being oriented parallel to each other. However, in alternative embodiments, the orientation of any scan line 201 with regard to others is arbitrary; each scan line 201 may have any angle with regard to any other scan line 201, so long as multiple transmit zones in a single scan line are oriented along the same axis.

FIG. 2 also shows each scan line 201 as being oriented parallel to the depth direction 202. However, in alternative embodiments, scan lines 101 need not be parallel to the depth direction 202, and may exhibit an angle with respect to the depth direction 202, so long as multiple transmit zones in a single scan line are oriented along the same axis.

Each scan line 201 comprises a set of transmit zones 204, each proceeding in the depth direction 202, and each being aligned along the scan line 201. Each transmit zone 204 comprises a set of discrete samples within which ultrasound energy is focused and for which sample points 205 represent returned ultrasound image data.

FIG. 2 also shows each scan line 201 to comprise two transmit zones 204. However, in alternative embodiments a scan line 201 may comprise three transmit zones 204 or some other number of transmit zones 204.

Each pair of adjacent transmit zones 204 collectively comprise an overlap region 206, in which there are sample points 205 for both transmit zones 204. Each sample point 205 in the overlap region 206 comprises an ultrasound imaging value, representing reflection (or other interaction) of the acoustic signals 102 with the objects or structures 104 in the scan plane 103. In a preferred embodiment used with B-mode imaging, the imaging value comprises a magnitude or intensity value for the reflected acoustic signals 102.

In alternative embodiments, the such as for color Doppler imaging, such as color Doppler energy (CDE) or Doppler tissue imaging (DTI), the imaging values for the sample points 205 may comprise velocity values or other values instead of magnitude or intensity values. Alternatively, there may also be more than one imaging value, such as both a magnitude or intensity value and a velocity value.

FIG. 2 also shows each overlap region 206 having the same size. However, in alternative embodiments overlap regions 206 may differ in size for differing scan lines 201, and may differ in size for differing pairs of adjacent transmit zones 204 in the same scan line 201. In some scan lines 201 and for some pairs of adjacent transmit zones 204, there may be a depth region in which no sample points 205 appear and the overlap region 206 may therefore have zero extent.

In the overlap region 206, a set of overlap sample points 205 are constructed in response to the sample points 205 from both transmit zones 204. These overlap sample points 205 in the overlap region 206 are constructed using a linear crossfade of the two transmit zones 204, as shown with regard to FIG. 3. In each scan line 101, the sample points 205 from the first transmit zone 204 and the sample points 205 from the second transmit zone 204 (other than the sample points 205 in the overlap region 206) are combined with the overlap sample points 205 constructed for the overlap region 206, to form a single unified scan line 101.

The Overlap Region Crossfade

FIG. 3 shows a single scan line having multiple transmit zones.

As noted with regard to FIG. 2, each scan line 101 comprises two or more transmit zones 204, each transmit zone 204 having a range of values in the depth direction 202, shown vertically in FIG. 3.

Two transmit zones 204 are shown slightly offset in FIG. 3 for convenience, although in a preferred embodiment the two transmit zones 204 would have identical or nearly-identical position in the cross-depth direction (e.g., an azimuthal direction), shown horizontally in FIG. 3.

Each transmit zone 204 has a set of sample points 205; the two transmit zones 204 overlap in an overlap region 206, in which each sample point 205 from the first transmit zone 204 is associated with a corresponding sample point 205 from the second transmit zone 204, to form a sample pair 207. In a preferred embodiment, in the overlap region 206, each sample point 205 from the first transmit zone 204 preferably is at the same spatial position as the corresponding sample point 205 from the second transmit zone 204.

In the overlap region 206, an overlap sample point 205 is constructed in response to each sample pair 207, by weighting the imaging value for the first and the second sample point 205 in each sample pair 207 subject to a weighting function, preferably a linear crossfade, but possibly another type of crossfade, such as a polynomial crossfade, an exponential crossfade, a table look-up crossfade, a logistical curve crossfade, or a crossfade in response to some other function, as described herein below.

In alternative embodiments, the overlap sample point 205 may be constructed in response to sample points in addition to, or other than, the pair of corresponding sample points. For example, in one alternative embodiment, the first sample point 205 and its two nearest neighbors from the first transmit zone 204 (a total of three sample points 205 from the first transmit zone 204) are weighted in response to the position of the first sample point 205 in the overlap region 206; similarly, the corresponding sample point 205 and its two nearest neighbors from the second transmit zone 204 (a total of three sample points 205 from the second transmit zone 204) are weighted in response to the position of the first sample point 205 in the overlap region 206; and the overlap sample point 205 is constructed in response to these six selected points, comprising three neighboring sample pairs 207. In this alternative embodiment, each sample point 205 would be used in constructing three neighboring overlap sample points 205.

The linear crossfade is illustrated by and employs two weighting factors ($\alpha$) and ($1-\alpha$). The first sample point 205 in each sample 207 pair is multiplied by the first weight ($\alpha$), which ranges linearly from one (1) at a first end 301 of the overlap region 206 to zero (0) at a second end 302 of the overlap region 206. The second sample point 205 in each sample pair 207 is multiplied by the second weight ($1-\alpha$), which ranges linearly from zero at the first end 301 of the overlap region to one at the second end 302 of the overlap region. The sum of the two weights ($\alpha$) and ($1-\alpha$) is always exactly one.

Thus, the $n^{th}$ overlap sample point 205, corresponding to the $n^{th}$ sample pair 207, is determined as follows:

$$D_n = \alpha_n (T \times 1_n) + (1 - \alpha_n)(T \times 2_n) \tag{350}$$

where $D_n = n^{th}$ overlap sample point 205, $\alpha_n$ = first weight factor for $n^{th}$ overlap sample point 205, $T \times 1_n = n^{th}$ sample point 205 for first transmit zone 204, $(1-\alpha_n)$ = second weight factor for $n^{th}$ overlap sample point 205, and $T \times 2_n = n^{th}$ sample point 205 for second transmit zone 204.

The value for $\alpha_n$ is determined as follows:

$$\alpha_n = 1 - [n/(N+1)] \tag{351}$$

where n = index of overlap sample point 205 (n=0 is the sample point 205 just prior to the first overlap sample point 205;

n=1 is the first overlap sample point 205; n=N is the last overlap sample point 205; and n=N+1 is the sample point 205 just after the last overlap sample point 205), and N = total number of overlap sample points 205.

In alternative embodiments, the linear crossfade may be replaced by another form of crossfade, such as a pair of weighting factors responsive to the depth direction 202 but which do not vary linearly with the depth direction 202. In such alternatives, the factor ($\alpha$) may vary with a polynomial function of a depth value, a trigonometric function of the depth value, a sum of exponential functions of the depth value, a value determined from a look-up table, or some other function. For example, the factor ($\alpha$) may vary with an S-shaped logistic curve having a value near zero for the first end 301 of the overlap region 206 and a value near one for the second end 301 of the overlap region 206.

In alternative embodiments, the overlap sample points 205 in the overlap region 206 may each be constructed in response to more than one sample point 205 from each transmit zone 204, such as in response to a set of neighborhood sample points 205 (such as adjacent sample points 205) from the first transmit zone 204 and a set of neighborhood sample points 205 from the second transmit zone 204.

In alternative embodiments having more than two transmit zones 204 overlapping, the overlap sample points 205 may be constructed in response to sample points 205 from each transmit zone 204 and in response to a set of weighting factors ($\alpha$), ($\beta$), ($\beta$), and so on, where the sum of the weighting factors ($\alpha+\beta+\gamma+\ldots$) equals one.

The Overlap Region Crossfade

FIG. 4A shows a data flow diagram for a linear crossfade. FIG. 4B shows a data storage diagram for a linear crossfade.

In a preferred embodiment, the transmit zones 204 are stored sequentially in a scan line memory 401. A first transmit zone 204 comprises a plurality of sample points 205, with each sample point 205 occupying a memory location 402. A second transmit zone 204 also comprises a plurality of sample points 205, with each sample point 205 occupying a memory location 402. The second transmit zone 204 is stored sequentially in memory locations 402 following the first transmit zone 204.

The overlap region 206 comprises a plurality of sample points 205 from the first transmit zone 204, followed sequentially with the plurality of sample points 205 from the second transmit zone 204. In the overlap region 206, there are an equal number of sample points 205 for the first transmit zone 204 and for the second transmit zone 204, so that corresponding sample points 205 in a sample pair 207 are always separated by the same number of memory locations 402.

The scan line memory 401 comprises an input port 403 for receiving sample points 205 as input data, an output port 404 for outputting sample points 205 as output data, and an address port 405 for addressing the memory locations 402.

The output port 403 from the scan line memory 401 is coupled to a crossfade weighting multiplier 410, which is also coupled to a weighting value at a node 411. The weighting value is provided by a crossfade ramp generator 420.

The crossfade ramp generator 420 comprises a crossfade accumulate enable signal line 421, for indicating if crossfade accumulation is to be performed, a step value bus 422, for indicating a step value for the linear crossfade, a crossfade ramp up/down signal line 423, for indicating if the crossfade is ramping up or down, and a crossfade weight enable signal line 424, for indicating if crossfade weighting is to be performed.

The step value bus 422 and the crossfade ramp up/down signal line 423 are coupled to inputs of an XOR gate 425, which thus inverts the step value bus 422 if the crossfade ramp up/down signal line 423 is logic "1". An output of the XOR gate 425 is coupled to an input of an adder 426, while the crossfade ramp up/down signal line 423 is coupled to a carry-in input for the adder 426.

The step value bus 422 comprises a positive step value in binary format. Thus, the combination of the XOR gate 425 and the adder 426 have the effect that the adder 426 adds the step value to its other input when the crossfade ramp up/down signal line 423 is logic "0", but subtracts the step value from its other input when the crossfade ramp up/down signal line 423 is logic "1".

An output of the adder 426 is coupled to an input of an accumulator register 427. The clock-enable input of the accumulator register 427 is coupled to the crossfade accumulate enable signal line 421. Thus, the accumulator register 427 accumulates the progressive sum of adding the step value, when the crossfade accumulate enable signal line 421 is logic "1" and holds the accumulated value otherwise.

An output of the accumulator register 427 is coupled to a first input for a multiplexer 428. A second input for the multiplexer 428 is coupled to a uniform unity value 429. A selector input for the multiplexer 428 is coupled to the crossfade weight enable signal line 424. Thus, the multiplexer 428 selects the output of the accumulator register 427 when the crossfade weight enable signal line 424 is logic "1", and selects the uniform unity value 429 otherwise.

An output of the multiplexer 428 is coupled to provide the weighting value at the node 411, which is fed back to the second input of the adder 426.

Thus, the crossfade ramp generator 420 provides a weighting value which is set to unity for all sample points 205 in the first transmit zone 204 outside the overlap region 207, successively ramps down by decrements of the step value in the overlap region 207 in the first transmit 204, successively ramps up by increments of the step value in the overlap region 207 in the second transmit zone 204, and is set to unity for all sample points 205 in the second transmit zone outside the overlap region 207. The weighting value thus remps down from unity at the sample point 205 just before the overlap region 207, to unity minus the step value at the first sample point 205 in the overlap region 207, to the step value at the last sample point 205 in the overlap region 207. Thereafter, the weighting value ramps up from the step value at the sample point 205 at the first sample point 205 in the overlap region 207 in the second transmit zone 204, to unity minus the step value at the last sample point 205 in the overlap region 207, to unity for all sample points 205 in the second transmit zone 204 outside the overlap region 207.

An output of the crossfade weighting multiplier 410 is coupled to an input of a crossfade summer 430. An output of the crossfade summer 430 at an output node 431 is coupled to an input of a FIFO 432; an output of the FIFO 432 is coupled to an input of an AND gate 433; an output of the AND gate 433 is fed back to a second input of the crossfade summer 430. A read-enable input of the FIFO 432 and a second input of the AND gate 433 are coupled to a crossfade summation enable signal line 434, while a write-enable input of the FIFO 432 is coupled to a crossfade FIFO write enable signal line 435. The length of the FIFO 432 is equal to the number of sample pairs 207 in the overlap region 206.

Thus, the crossfade summer 430 provides a summation for each sample pair 207, at the output node 431, when the crossfade summation enable signal line 434 is logic "1". During the overlap region 206 for the first transmit zone 204, the crossfade FIFO write enable signal line 435 is logic "1", each sample point 205 is stored in the FIFO 432, and the sample points 205 are ignored by downstream elements. During the overlap region 206 for the second transmit zone 204, the crossfade FIFO write enable signal line 435 is logic "0", summation is performed for sample points 205 in the the overlap region 206 for the second transmit zone 204, the output of the crossfade summer 430 at the node 431 is equal to the summation for each sample pair 207, and the summed sample points 205 are processed by downstream elements.

Alternative Embodiments

Although preferred embodiments are disclosed herein, many variations are possible which remain within the concept, scope, and spirit of the invention, and these variations would become clear to those skilled in the art after perusal of this application.

I claim:

1. A method for multiple transmit zone splicing in an imaging system, comprising the steps of:
   receiving a set of acoustic signal samples for a first transmit zone;
   receiving a set of acoustic signal samples for a second transmit zone spatially overlapping said first transmit zone in an overlap region;
   dynamically generating weighting values and applying said weighting values to the signal samples in the overlap region to create weighted signal samples; and
   synthesizing a set of new signal samples for said overlap region from said weighted signal samples.

2. The method of claim 1, wherein said synthesizing step includes summing said weighted signal samples.

3. The method of claim 1, wherein said dynamically generating and applying step generates weighting values as a function of at least the number of signal samples in the overlap region.

4. The method of claim 1, wherein said dynamically generating and applying step generates weighting values as a function of the number of signal samples in the overlap region and position of at least one signal sample in the overlap region.

5. The method of claim 1, said dynamically generating and applying step including defining an indexed sequence of pairs of acoustic signal samples in said overlap region, a first acoustic signal sample in each said pair for said first transmit zone and a second acoustic signal sample in each said pair for said second transmit zone, each said pair of acoustic signal samples having an index; and wherein said dynamically generating and applying step generates said weighting values as a function of the number of signal samples in the overlap region and the indices.

6. The method of claim 1, said dynamically generating and applying step including:

processing the acoustic signal samples of the two transmit zones in the overlap region sequentially by weighting each of said acoustic signal samples in the first transmit zone in the overlap region by a corresponding weighting value generated by the dynamically generating step and then by weighting each of said acoustic signal samples in the second transmit zone in the overlap region by a corresponding weighting value generated by the dynamically generating step;

wherein the corresponding weighting value for each of the acoustic signal samples in the first and second transmit zones in the overlap region are generated in the same order that said acoustic signal samples for said first and second transmit zones in said overlap region are processed in the processing step.

7. The method of claim 6, said processing step including sequentially multiplying each of said signal samples in the overlap region of the two transmit zones by a corresponding weighting value, wherein said generating step generates the weighting values sequentially by incrementing or decrementing from a prior weighting value.

8. An apparatus for multiple transmit zone splicing in an imaging system, comprising:

means for receiving a set of acoustic signal samples for a first transmit zone;

means for receiving a set of acoustic signal samples for a second transmit zone spatially overlapping said first transmit zone in an overlap region;

means for dynamically generating weighting values and applying said weighting values to signal samples in the overlap region to create weighted signal samples; and means for synthesizing a set of new signal samples for said overlap region from said weighted signal samples.

9. The apparatus of claim 8, wherein said synthesizing means includes means for summing said weighted signal samples.

10. The apparatus of claim 8, wherein said dynamically generating and applying means generates weighting values as a function of at least the number of signal samples in the overlap region.

11. The apparatus of claim 8, wherein said dynamically generating and applying means generates weighting values as a function of the number of signal samples in the overlap region and position of at least one signal sample in the overlap region.

12. The apparatus of claim 8, said dynamically generating and applying means including:

means for processing the acoustic signal samples of the two transmit zones in the overlap region sequentially by weighting each of said acoustic signal samples in the first transmit zone in the overlap region by a corresponding weighting value generated by the dynamically generating step and then by weighting each of said acoustic signal samples in the second transmit zone in the overlap region by a corresponding weighting value generated by the dynamically generating step; and a crossfade ramp generator generating the corresponding weighting value for each of the acoustic signal samples in the first and second transmit zones in the overlap region in the same order that said acoustic signal samples for said first and second transmit zones in said overlap region are processed by the processing means.

13. The apparatus of claim 12, said processing means processes the signal samples of the two transmit zones in the overlap region sequentially by multiplying each of said signal samples by a corresponding weighting value generated by the crossfade ramp generator, wherein said crossfade ramp generator generates the weighting values sequentially by incrementing or decrementing from a prior weighting value.

14. A method for displaying an ultrasound image, comprising the steps of:

receiving a set of acoustic signal samples for a first transmit zone;

receiving a set of acoustic signal samples for a second transmit zone spatially overlapping said first transmit zone in an overlap region;

dynamically generating weighting values and applying said weighting values to the signal samples in the overlap region to create weighted signal samples; and synthesizing a set of new signal samples for said overlap region from said weighted signal samples;

constructing a set of synthesized scan lines comprising, outside said overlap region, acoustic signal samples of said sets of acoustic signal samples for the first and second transmit zones, and inside said overlap region, said set of new signal samples for said overlap region; and scan converting said set of synthesized scan lines.

15. An apparatus for displaying an ultrasound image, comprising:

means for a set of acoustic signal samples for a first transmit zone;

means for a set of acoustic signal samples for a second transmit zone spatially overlapping said first transmit zone in an overlap region;

means for dynamically generating weighting values;

means for constructing a set of synthesized scan lines comprising, outside said overlap region, acoustic signal samples of said sets of acoustic signal samples for the first and second transmit zones, and inside said overlap region, said set of new signal samples for said overlap region; and means for scan converting said set of synthesized scan lines.

\* \* \* \* \*

UNITED STATES PATENT AND TRADEMARK OFFICE
CERTIFICATE OF CORRECTION

PATENT NO.   : 5,579,770
DATED        : December 3, 1996
INVENTOR(S)  : David J. Finger It is certified that error appears in the above-identified patent and that said Letters Patent is hereby corrected as shown below:

In column 6, line 37, replace the second occurrence of "($\beta$)" with --($\gamma$)--.

Signed and Sealed this

Twelfth Day of May, 1998

Attest:

BRUCE LEHMAN

Attesting Officer

Commissioner of Patents and Trademarks